July 23, 1935. F. G. FOLBERTH ET AL 2,009,170
CONTROL VALVE FOR FLUID PRESSURE ACTUATED BRAKES AND THE LIKE
Filed Feb. 28, 1933 4 Sheets-Sheet 1

Inventors
FREDERICK G. FOLBERTH
& WILLIAM M. FOLBERTH
By Richey & Watts
Attorneys

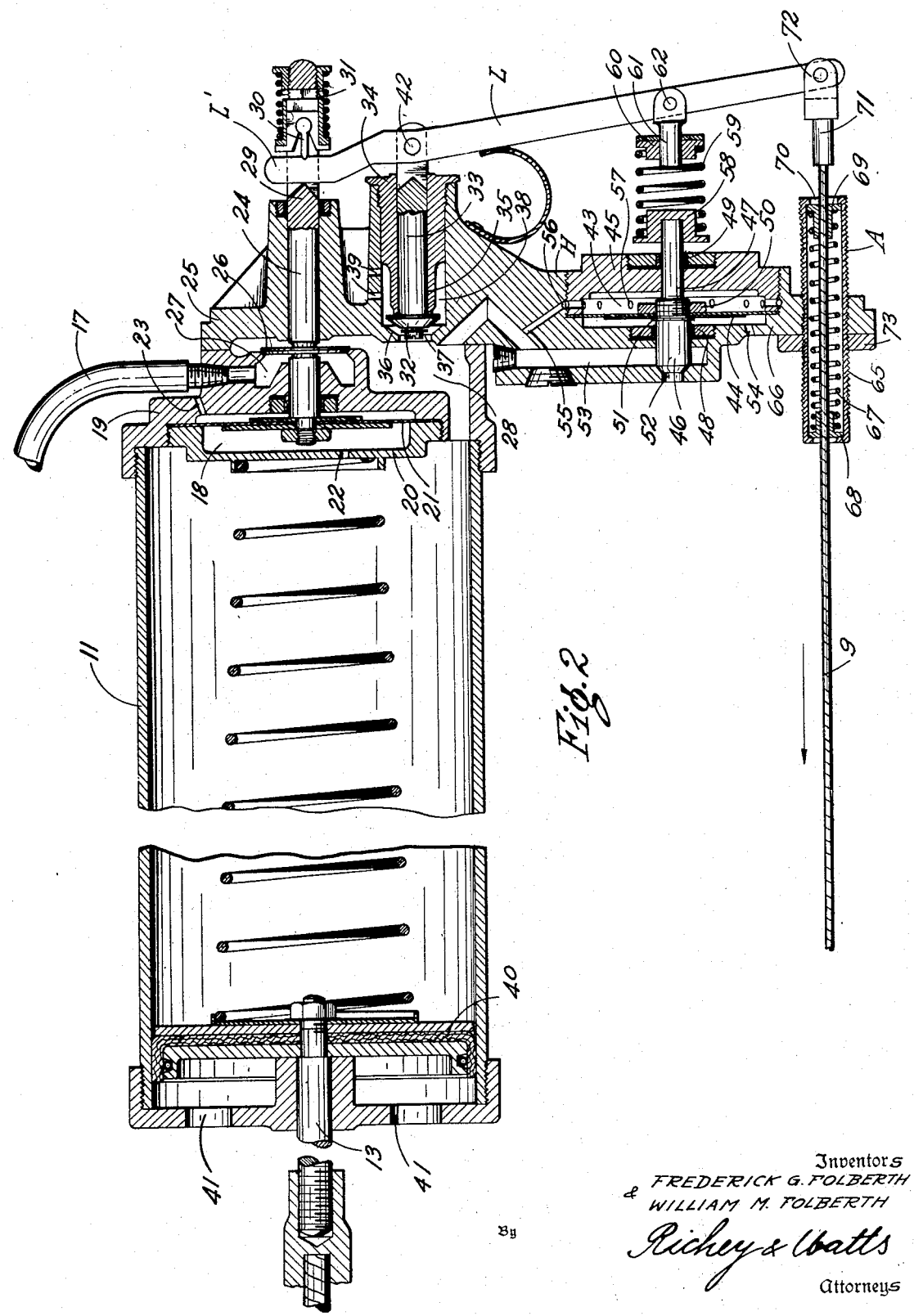

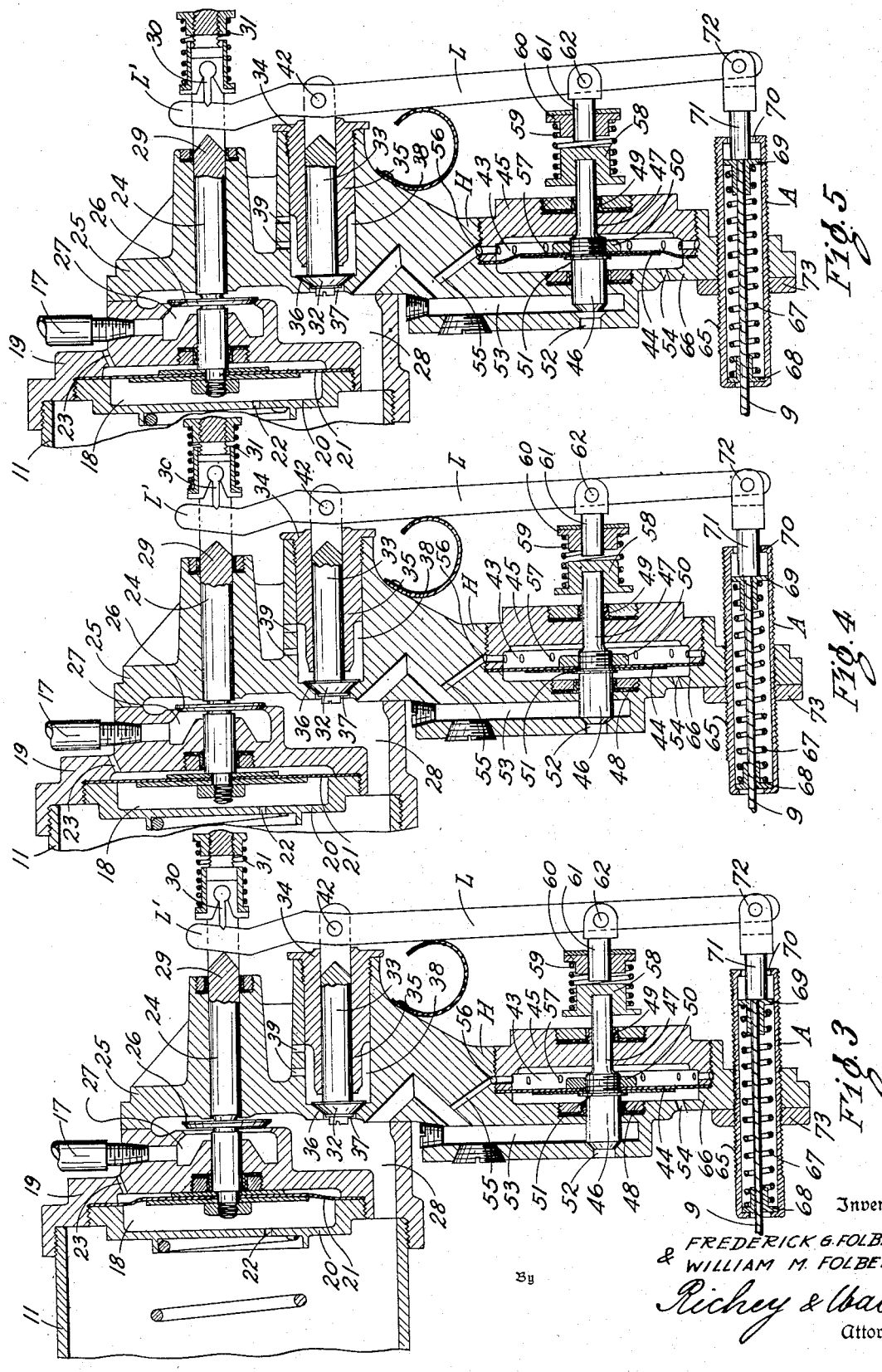

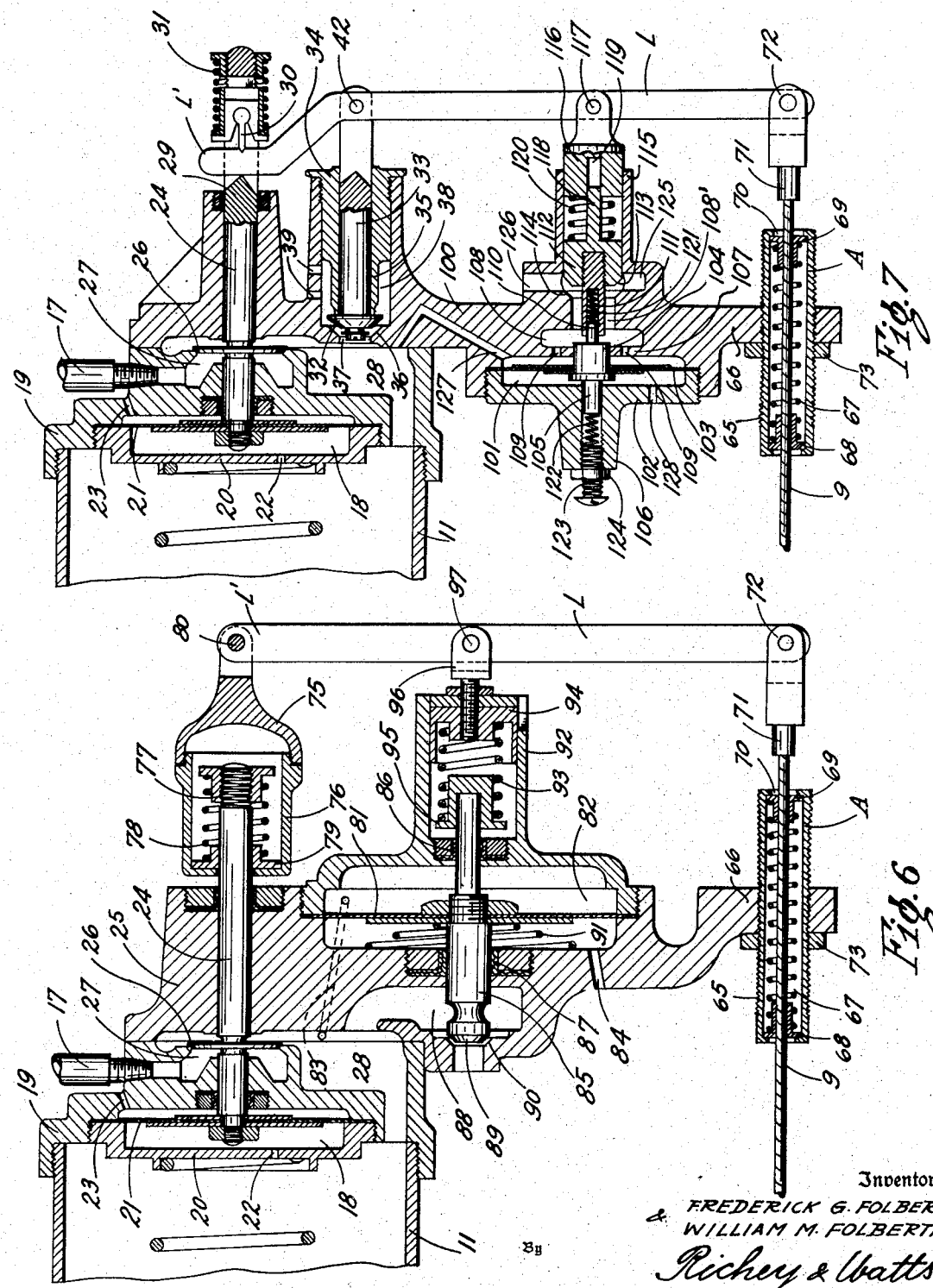

Patented July 23, 1935

2,009,170

UNITED STATES PATENT OFFICE 2,009,170

CONTROL VALVE FOR FLUID PRESSURE ACTUATED BRAKES AND THE LIKE

Frederick G. Folberth and William M. Folberth, Cleveland, Ohio

Application February 28, 1933, Serial No. 658,972

11 Claims. (Cl. 303—54)

This invention relates to fluid pressure actuated devices and more particularly to improved control valve mechanism for controlling the operation of fluid pressure actuated means for operating the brakes of a motor vehicle.

In our co-pending United States patent applications, Serial No. 395,548, filed September 27, 1929; Serial No. 483,328, filed September 20, 1930; Serial No. 611,854, filed May 17, 1932 and Serial No. 636,704, filed October 7, 1932, we have described and claimed certain improvements in mechanisms for the fluid pressure operation of vehicle brakes. These devices are particularly adapted for use with brake control hook-ups in which the operation of the brakes is controlled by the vehicle clutch operating lever. The present application relates to certain improvements of the general type of apparatus described and claimed in our above noted co-pending applications, and it is among the objects of the present invention to provide a simple and compact fluid pressure brake control valve mechanism which is promptly responsive to the movements of the operating lever and which permits the application and release of the vehicle brakes in an effective manner.

Other objects of our invention are: the provision of a brake control mechanism in which successively small movements of the brake controlling lever in brake applying direction will cause successively small increases in the force exerted to apply the brakes and in which successively small movements of the lever in brake releasing direction will permit the brakes to be released in correspondingly small increments; the provision of a brake control mechanism which is of compact and efficient construction and which is particularly adapted to be applied to present-day automotive vehicles without excessive cost and without rebuilding or redesigning the ordinary brake system; the provision of control mechanism for fluid pressure actuated brakes in which small movements of the operating lever in brake releasing direction are adapted to permit a momentary connection of the operating cylinder to the atmosphere whereby the brakes will be released a correspondingly small amount.

The above and other objects of our invention will appear from the following description of several embodiments thereof, reference being had to the accompanying drawings, in which—

Figure 2 is a longitudinal cross section taken through the operating cylinder and control valve unit and showing the parts in the normal or brake released position.

Figure 3 is a fragmentary view generally similar to Figure 1 but illustrating only the valve mechanism and showing the position the valve parts assume when they have been moved to cause application of the brakes.

Figure 4 is a view generally similar to Figure 3 but illustrating the parts in the positions they assume when the brake has been applied and the operating lever is being maintained in a fixed position.

Figure 5 is a view generally similar to Figure 3 but illustrating the parts in the positions they assume when the operating lever has been moved a relatively small amount in brake releasing direction whereby the auxiliary release valve is opened and the cylinder is momentarily connected to the atmosphere to permit a small amount of releasing movement of the brakes.

Figure 6 is a sectional view generally similar to Figure 2 but illustrating a modified form of our invention.

Figure 7 is a sectional view generally similar to Figure 6 but illustrating another modification of our valve mechanism.

Figure 1:
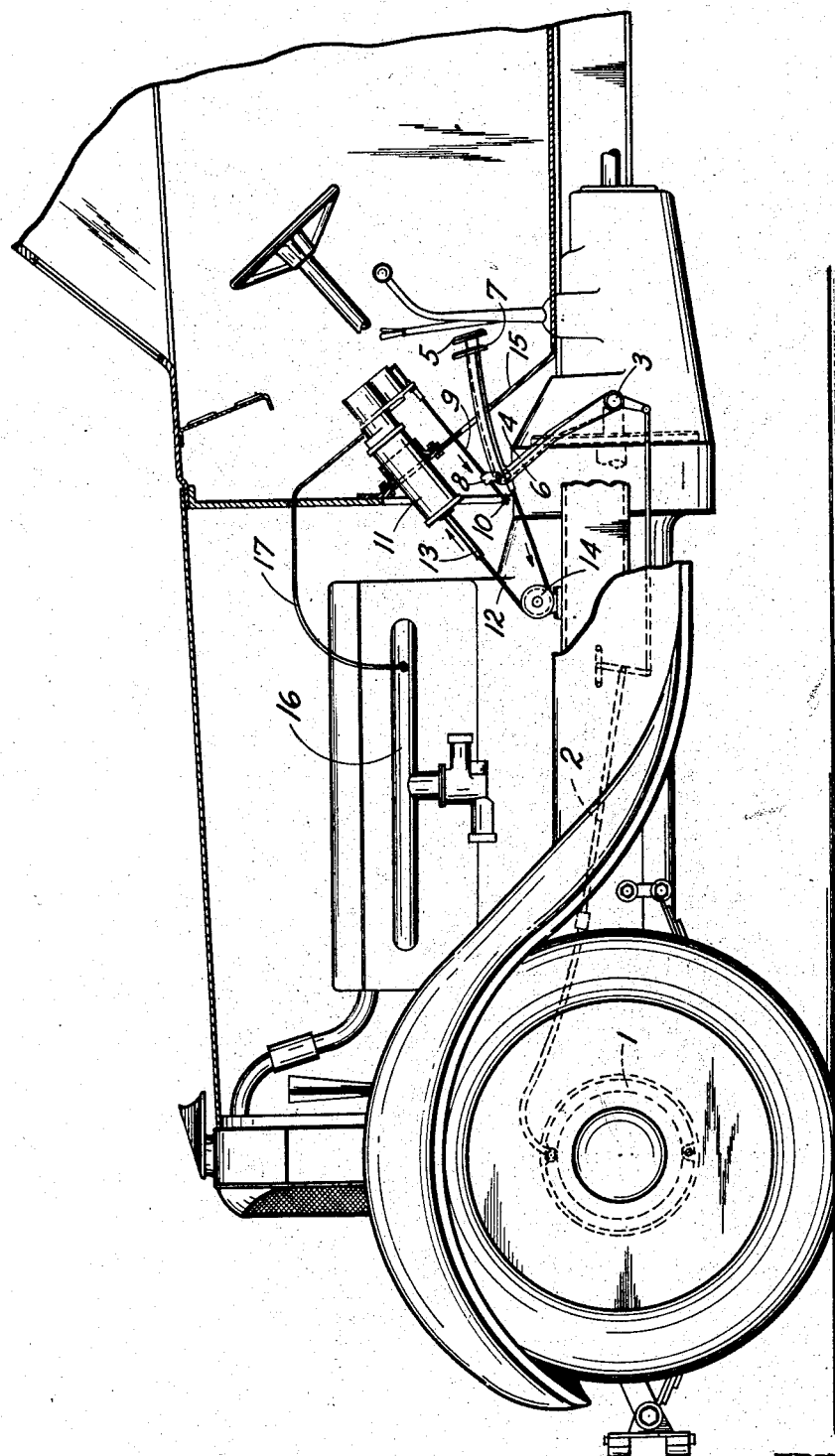
Figure 1 is a fragmentary side elevation, partly in section, of the forward end of an automotive vehicle illustrating our improved brake actuating and controlling mechanisms in its normal or brake released position.

In our co-pending application, Serial No. 611,854, filed May 17, 1932, we have described and claimed an auxiliary control valve adapted, under certain conditions, to connect the operating cylinder directly to the atmosphere through a relatively large opening. The operation of this valve is controlled by the main control valve operating mechanism and the auxiliary valve is preferably so arranged that a small movement of the main control valve operating connection in brake releasing direction will permit the auxiliary atmospheric valve to open momentarily and then promptly close. This rapid opening and closing action of the auxiliary valve permits the pressure conditions within the brake operating cylinder to change a relatively small amount thus effecting a relatively small release of the vehicle brakes.

The principle of operation and chief functions of our present auxiliary control valve are similar to those of the auxiliary valve described in our co-pending application, Serial No. 611,854, above noted, but the present invention combines the auxiliary valve in a single compact unit with a main control valve of the type described and claimed in our co-pending application, Serial No. 636,704, filed October 7, 1932 in a particularly compact and effective unit.

Referring now to Figure 1 of the drawings, the automobile illustrated is of the usual type and is preferably provided with both front and rear wheel brakes. Only the front wheel brakes 1 are illustrated and these are adapted to be operated through suitable connections 2 which extend to the cross shaft 3 to which is secured the brake operating lever 4 having a pedal 5 at its upper end. The vehicle clutch operating lever 6 is of the usual type and is provided with a pedal 7. We have illustrated our brake operating unit as controlled by operation of the vehicle clutch pedal, but it will be understood by those skilled in the art that a separate pedal or lever could be provided for operating the valve mechanism or the valve mechanism could be operated directly from the usual brake pedal. The clutch lever 6 is provided with an upwardly extending member 8 which has sliding engagement with the rod or cable 9. An adjustable stop 10 is secured to the rod or cable 9 at one end thereof and the other end is connected to operate the brake control mechanism, as will be later described. When the parts are in the positions shown in Figure 1, the clutch is in its engaged position and the brake is released. During the first movement of the clutch pedal in clutch disengaging direction the member 8 merely slides over the rod or cable 9 and the adjustable stop 10 is preferably so positioned that, when the clutch is completely disengaged, the member 8 will engage the stop 10 and apply a downward pull on the valve operating mechanism. This tends to operate the valve to cause the piston in the cylinder 11 to move upwardly therein thus exerting a pull on the cable 12 which is connected to the piston rod 13 at one end and to the brake lever 4 at its opposite end. The cable 12 extends around a pulley 14 and the movement of the piston upwardly in the cylinder will move the brake lever 4 downwardly in brake aplying direction.

In the embodiment of our invention illustrated in Figure 1 the brake operating mechanism is shown supported by and extending through the floor board 15 of the vehicle and the cylinder 11 is connected to the intake manifold 16 by the pipe 17, but it will be understood that the apparatus may be installed in any suitable location on the vehicle and that any other suitable source of actuating pressure may be provided.

Figure 2 illustrates the brake control and operating unit proper, the parts being in the positions they would assume when the other control elements are in the positions shown in Figure 1. The main control valves are mounted in a housing which also forms an upper end cap for the cylinder 11. This valve arrangement is generally similar to that shown in our co-pending application, Serial No. 636,704, filed October 7, 1932, and will, therefore, be but briefly described herein.

A diaphragm chamber 18 is formed by the end cap 19 and the cover plate 20. A diaphragm 21 is supported in the chamber 18 and the cover plate 20 is provided with a relatively small passage 22 which connects the chamber 18 with the interior of the cylinder 11. The portion of the chamber 18 on the opposite side of the diaphragm 21 from the cylinder 11 is connected to the atmosphere through a vent hole 23. The inner end of the valve rod 24 is secured to the diaphragm 21 and extends through suitable bores or bearing portions in the end cap 19 and the housing member 25. The valve seat 26 is carried by the rod 24 and adapted to seat against the end cap 19. As will be seen from Figure 2, when the valve 26 is seated the connection to the pipe 17, and thus to the intake manifold, is closed. When the valve 26 is lifted from its seat the connection from the cylinder 11 to the intake manifold is completed through the chamber 27 and the passage 28 formed in the end cap member 19. The outer end of the rod 24 is provided with a knife edge 29 which engages one side of the upper end L' of the main valve operating lever L. The opposite side of the end L' of lever L engages a pivoted knife edge member 30 which is mounted for sliding movement in a slot in the rod 24 and an adjustable spring 31 acts as a resilient support for the knife edge 30.

The main atmospheric connection control valve 32 is carried by a rod 33 which is pivoted at its outer end to the lever L and has a bearing in the bushing 34. This bushing 34 is screwed into position in a suitable aperture in the housing 25 and has an inner end of reduced diameter, as shown at 35. The valve 32 is adapted to seat upon a seat 36 and, when the valve 32 is in open position as shown in Figure 2, a passage is provided from the chamber 28 to the atmosphere through the aperture 37, the annular space 38 around the reduced end 35 of sleeve 34, and the holes 39 which extend through the wall of the housing 25.

In Figure 2 the vacuum control valve 26 is closed and the main atmospheric control valve 32 is open. Thus, the interior of the cylinder 11 is under atmospheric pressure and no force is exerted on the piston 40 as the piston rod end of the cylinder 11 is also connected to the atmosphere through the holes 41.

Briefly, the operation of the valve to cause application of the brakes is as follows:

When the cable 9 is moved in the direction of the arrow (Figure 2) the lever L is first moved about the knife edge 29 as a fulcrum and the rod 33 and the valve 32 are moved to the left until the valve is seated thus closing the atmospheric connection to the interior of the cylinder. Further movement of the cable 9 to the left will now cause the lever L to move about the pivotal connection 42 of the lever L with the rod 33, as this point becomes fixed when the valve 32 reaches its seat 36. This movement of the lever L about the point 42 will cause the valve 26 to be lifted from its seat and the intake manifold suction will be connected to the interior of the cylinder and the pressure therein will be reduced. This reduced pressure will also be applied, through the small hole 22, to the left hand side of the diaphragm 21 and when a sufficient force is exerted on the diaphragm 21 by the atmospheric pressure on the right hand side thereof to compress the spring 31, the rod 24 and valve 26 will be moved to the left until the valve 26 is again seated and the vacuum connection closed. During this movement of the valve 26 and rod 24 the lever L will remain stationary and the spring 31 will be compressed. Thus, the spring 31 is in balanced relation to the diaphragm 21 and now, as both the valve 26 and the valve 32 are closed, the pressure conditions within the cylinder 11 will remain constant until the lever L is either moved to cause further reduction of the pressure in the cylinder or to permit the pressure in the cylinder to approach atmospheric pressure thus causing corresponding release of the brakes.

The auxiliary brake release valve mechanism is contained in a housing generally indicated at H and which may conveniently be made integral with the housing 25. A diaphragm chamber 43 is formed in the housing H and a diaphragm 44 is held in position on a suitable shoulder in the housing H by the cover plate 45 which has threaded engagement with the housing H. The auxiliary valve 46 is carried by a rod or stem 47 which extends through both side walls of the chamber 43. Leakage to or from the chamber 43 around the stem 47 may be prevented by packing as indicated at 48 and 49. The stem 47 passes through and is secured to the diaphragm 44 in any suitable manner, such as by means of the nut 50 which holds the diaphragm in position against a flange 51 on the stem 47. As will be seen from Figure 2 the valve portion 46 is disposed at the left end of the stem 47 and is adapted to close the passage 52 which connects the passage 53 to the atmosphere. The passage 53 extends to the chamber 28 and thus is connected to the interior of the cylinder 11.

The portion of the diaphragm chamber 43 on the left hand side of the diaphragm 44 is connected to the atmosphere through a vent hole 54 and the right hand side is connected to the passage 53 through a passage 55 which extends to an annular groove 56 in the housing H. The end plug 45 is provided with a corresponding annular groove and holes 57 extend from this groove into the chamber 43 on the right hand side of the diaphragm. The end of the stem 47 which extends out through the plug 45 is provided with a spring supporting flange member 58 which carries a coil spring 59.

At the opposite end of the spring 59 is a flanged plug 60 which is mounted on a rod 61. The operating lever L is pivotally secured to the rod 61 at 62. The spring 59 is of such a character that when the parts are in the position shown in Figure 2 it is under a certain degree of compression and thus tends to hold the valve 32 open, the valve 26 closed and the valve 46 closed. In Figure 3 we have illustrated the valves 26, 32 and 46 closed which is the position they assume when the brakes are held at any desired degree of application. In this position the spring 59 has been somewhat compressed and it will be seen that the same degree of vacuum is applied to the right hand side of the diaphragm 44 as exists within the main cylinder 11 as said side of the diaphragm 44 is connected at all times to the interior of the cylinder through passages above described. The spring 59 is so designed that it exerts a greater force on the rod 47 in a direction to hold the valve 46 closed than that exerted by the suction on the diaphragm 44 to open the valve 46. Now, if the operator releases the pressure of his foot upon the clutch operating pedal the cable 9 will be permitted to move slightly to the right (Figures 2 and 3). The pressure upon the spring 59 will be relieved and the parts preferably are so proportioned that a small release of the pressure of the operator's foot will permit the pressure on the spring 59 to be relieved enough so that the action of the vacuum on the diaphragm 44 will be strong enough to overcome the spring 59 and lift the valve 46 from its seat. Immediately air will rush into the cylinder from the atmosphere through the passages 52 and 53 and the degree of vacuum in the cylinder will be reduced. A corresponding reduction in the degree of vacuum effective on the right hand side of the diaphragm 44 will also take place and the pressure of the spring 59 will again become great enough to overcome the effect of the vacuum on the diaphragm and the valve 46 will be closed. Thus, the valve 46 will act to permit a momentary and relatively small inrush of air to the cylinder 11 and, as this will reduce the vacuum in the cylinder 11, the piston 40 will be permitted to move a short distance to the left (Figure 2) and the brakes will be released a small amount. As noted above the object of this arrangement is to permit the operator to release the brakes in small increments as is important in obtaining the proper control of the vehicle. Figure 5 illustrates the positions of the control valve parts during this momentary opening of the valve 46 and it will be noted that the valves 32 and 26 remain seated.

If it is desired to quickly and completely release the brakes after they have been applied the operator removes his foot from the control pedal and the spring 59 will move the lever L about the point 42 as a pivot thus permitting the upper end L' of the lever L to move from the position shown in Figure 5 into contact with the knife edge 29.

Further movement of the lever L will now be about the knife edge 29 as a fulcrum and the spring 59 will cause the lever to move to lift the valve 32 from its seat and thus connect the cylinder to the atmosphere and permitting the brakes to be completely released. At the same time the initial release of the compression of the spring 59 will permit the vacuum to act upon the diaphragm 44 to lift the valve 46 off of its seat and an additional connection from the cylinder to the atmosphere will be provided through the passages 53 and 52. However, as soon as the vacuum within the cylinder, and consequently within the chamber 43 on the right hand side of the diaphragm 44, is reduced a certain amount the spring 59 will overcome the effect of the diaphragm 44 and the valve 46 may again be seated. The parts will then assume the position shown in Figure 2 and will be ready for another application of the brakes. It will be understood that the reseating of the valve 46 will depend upon the relative forces exerted by the diaphragm 44 and the spring 59 and that by properly proportioning the parts the desired action may be obtained.

An analysis of Figures 3, 4 and 5 will be helpful to the proper understanding of the operation of our apparatus.

In Figure 3 the lever L has been moved to the left as compared to Figure 2, the valve 32 has been closed, the valve 26 has been opened, the spring 59 has been compressed and the valve 46 is maintained against its seat. While in this position air is being withdrawn from the cylinder 11 by the suction of the intake manifold and atmospheric pressure is acting upon the left hand end of the piston 40 to move it to the right (Figure 2) thus causing the brakes to be applied.

In Figure 4 the same vacuum conditions have been reached within the diaphragm chamber 18 as exist within the cylinder 11 and the action of atmospheric pressure upon the right hand side of the diaphragm 21 has caused the valve 26 to again be seated. This seating movement of the valve 26 has moved the knife edge away from the end L' of the lever L and has caused the spring 31 to be compressed. The apparatus is now in a static or balanced condition with a certain degree of vacuum maintained within the cylinder. The degree of vacuum which will be maintained, and consequently the braking force applied, will, of course, depend upon the distance the lever L has been moved and the load imposed on the spring 31 which must be balanced by the diaphragm 21 before the valve 26 will seat to shut off the vacuum connection.

In Figure 5 the lever L has been permitted to move to the left a small distance from the position shown in Figure 4. This movement has not been sufficient to cause the end L' of the lever L to engage the knife edge 29 and therefore the valve 32 has not been lifted from its seat. However, the compressive force exerted upon the spring 59 has been relieved sufficiently to permit the pressure differential between the opposite sides of the diaphragm 44 to move the rod 41 to the right, against the spring 59, and lift the valve 46 from its seat. As soon as the rush of air into the cylinder through the passage 53 has reduced the vacuum on the right hand side of diaphragm 44 enough to permit the spring 59 to again overcome the above noted pressure differential the valve 46 will be closed and the parts will then again assume substantially the position shown in Figure 4, although the lever L will, of course, remain in the position shown in Figure 5.

Successive small movements of the lever L to the right will cause successive opening and closing movements of the valve 46, each of these opening and closing movements being accompanied by a corresponding relatively small reduction of the vacuum within the cylinder 11 and release of the vehicle brakes.

By combining the main vacuum and atmospheric connection control valves and our improved auxiliary atmospheric control valve we have obtained a fluid pressure brake control mechanism which is particularly adapted for controlling the operation of so-called "vacuum" brakes.

We preferably provide our brake control apparatus with a spring loading unit generally indicated at A. This unit comprises a tubular housing 65 threaded on its outer surface and having threaded engagement in an extending lug 66 on the housing H. A spring 67 is disposed within the housing 65 and flanged guide members 68 and 69 are positioned at the ends of the spring and adapted to slide within the tubular housing 65. The operating cable or rod 9 passes through the guide members 68 and 69 and also through the spring 67 and the housing 65. The right hand end of the housing 65 is provided with an opening 70 through which the shank 71 of the yoke 72 may pass. The rod or cable 9 is secured to the shank 71 and the yoke 72 is pivotally connected to the lower end of the lever L. As is seen in Figures 3, 4 and 5, the shank 71 is adapted to pass through the opening 70 and engage the sliding flange 69. After this engagement takes place further movement of the cable or rod 9 and the lever L in brake applying direction will be against the resistance of the spring 67. The tubular sleeve 65 may be adjusted in the lug 66 and locked in the desired position by means of the lock nut 73. We prefer to position the sleeve 65, and consequently the spring resistance 67, so that the end of the shank 71 will engage the sliding flange 69 at substantially the same time that the valve 26 has been opened just enough to cause the slack to be taken up in the brake connections and the brakes to be placed in position for immediate application. Further movement of the lever L in brake applying direction will then be effective to apply the vehicle brakes and, as the operator can feel the increased resistance caused by the spring 67, he will be given a positive indication when the brake applying portion of the movement of the clutch actuating pedal has been reached. The spring 67 is also effective in assisting to move the lever L to the right during brake releasing movements of the valve mechanism and therefor the spring 59 may be made lighter and more sensitive, thus permitting a relatively small diaphragm 44 to be used. It will be understood that the just described loading or resistance device might be used if a separate brake control lever were provided instead of a combination clutch and brake lever, as shown.

In Figure 6 we have illustrated a modified form of our control valve mechanism for vacuum brakes and the like. A number of the parts of this modified apparatus are exactly the same as and perform the same functions as corresponding parts in the embodiment shown in Figures 1 to 5. Therefore, these like parts have been similarly numbered. The main vacuum control valve 26 is carried on a rod 24. The left hand end of the rod 24 is secured to a diaphragm 21 mounted in the diaphragm chamber 18. The lever L is connected at its upper end L' to the rod 24 by a somewhat different arrangement than that illustrated in Figures 2 to 5 inclusive. In Figure 6 the upper end of the lever L is pivotally secured to a threaded cap member 75 which acts as an end closure for the cylindrical sleeve 76. The rod 24 passes through an aperture in the end of the sleeve 76 and is adapted to move freely therethrough. The end of the rod 24 is threaded for an adjustable flange 77 and a spring 78 is disposed between the flange 77 and a corresponding flange 79 which is adapted to slide on the rod 24.

It will be seen that when the pivot point 80 between the lever L and the end cap 75 is moved to the right (Figure 6) the spring 78 will transmit such motion to the rod 24 and the valve 26. After the valve 26 reaches the limit of its opening movement further movement of the pivot point 80 to the right will compress the spring 78 and impose a load which must be balanced by the diaphragm 21 to close the valve 26, as is described above.

In Figure 6 the main atmospheric connection valve and the auxiliary atmospheric connection valve have been combined in a single unit. A diaphragm 81 is disposed in the diaphragm chamber 82. The right hand side of the diaphragm chamber is connected to the passage 28, and thus to the interior of the cylinder 11, by means of a passage 83 in the housing 25. The opposite side of the diaphragm 81 is connected to the atmosphere through the passage 84. Extending through and secured to the diaphragm 81 is a valve rod 85 which passes through the walls of the diaphragm chamber 82. To prevent leakage around the rod 85 packing rings 86 and 87 of leather, or other suitable material, may be provided. The left hand end of the rod 85 projects into a passage way or chamber 88 and carries at its end a valve closure member 89 which is adapted to seat on a seat 90 thus closing off communication between the interior of the cylinder 11 and the atmosphere. A spring 91 lies within the diaphragm chamber 82 on the left hand side of the diaphragm and tends to maintain the diaphragm 81 and the valve 89 in their fully open position, as shown in Figure 6. A cylindrical sleeve 92 is carried by the outer wall of the diaphragm chamber 82 and encloses a spring 93 which is supported between the plunger 94 and the flanged cap member 95. The cap 95 is mounted on the outer end of the rod 85 and the plunger 94 is adapted to slide within the cylinder 92 and carries a yoke member 96 which is pivotally connected to the lever L at 97. The spring loading unit A is substantially the same as and performs the same functions as described above.

The operation of the above described apparatus is as follows:

When the parts are in the position shown in Figure 6 the vacuum connection valve is closed and the interior of the cylinder is open to the atmosphere through the chambers 28 and 88. If the cable 9 is moved to the left in the direction of the arrow the lever L will first be swung about the point 80 as a pivot and the plunger 84, the spring 93, the rod 85 and the diaphragm 81 will be moved to the left causing the valve 89 to engage its seat 90 thus shutting off the atmospheric connection to the interior of the cylinder. Further movement of the cable 9 in the same direction will cause the valve 26 to be lifted from its seat thus connecting the cylinder to the intake manifold and causing the brakes to be applied. The valve 26 will be lifted from its seat when the spring 93 has been compressed an amount great enough to cause the point 97 to become relatively stationary so that it will act as a fulcrum for the lever L.

After the valve 26 has been opened it will be closed again when the vacuum within the diaphragm chamber 18 reaches a point where the diaphragm 21 will overcome the spring 78 and move the valve 26 into seated position.

Now, after the cable 9 is slightly released thus permitting the lever L to move to the right a relatively small distance the pressure on the spring 93 will be relieved. The spring 93, the spring 91 and the diaphragm 81 are so proportioned that a relatively slight release of the compression of the spring 93 will permit the combined action of the spring 91 and the pressure differential acting upon the diaphragm 81 to lift the valve 89 from its seat thus permitting a quick inrush of air to the cylinder 11. This inrush of air, however, will reduce the vacuum within the cylinder 11, and consequently within the diaphragm chamber 82 on the right hand side of the diaphragm 81 and the spring 93 will again overcome the spring 91 and the force of the diaphragm, causing the valve 89 to again be seated. Thus, with the arrangement illustrated in Figure 6 a relatively small releasing action will be obtained for correspondingly small releasing movements of the control lever in a manner generally the same as that described in connection with the apparatus of Figures 1 to 5. If the operator desires to completely release the brakes of the apparatus shown in Figure 6 he need only release the cable 9 under which circumstances the spring 91 will lift the valve 89 completely from its seat and, as the compression of the spring 93 is also released, there will be no force tending to again close the valve 89. Thus, an instantaneous complete release or a gradual release of the brakes in small increments may be obtained with this apparatus.

Figure 7 illustrates another modified form of our invention. This embodiment is generally similar to that shown in Figures 2, 3, 4 and 5, except for the auxiliary atmospheric control valve arrangement. The main atmospheric control valve 32 and the actuating pressure control valve 26, together with the operating lever arrangement for these valves is illustrated in substantially the same form as the above noted figures and these parts will, therefore, be referred to by the same reference numbers.

The downwardly extending bracket 100 forms one wall of diaphragm chamber 101, the other wall of this chamber being formed by the cap member 102 which has threaded engagement with the bracket 100 and also serves to clamp the outer periphery of the diaphragm 103. Secured to the center of the diaphragm 103 is a cylindrical member 104 which has a reduced portion 105 adapted to slide in a suitable bore in the outwardly projecting boss 106 on the cap 102. The member 104 extends through and is guided by a flange 107 which forms one wall of a chamber 108 in the bracket 100. Holes 109 extend through the flange 107 for reasons which will appear later. The portion of the member 104 which extends into the chamber 108 carries a reduced stem 110 which has a sliding fit in the tubular member 111. This tubular member 111 is secured to the valve plunger 112 and is adapted to move therewith. A valve face 113 is formed on the left hand end of the plunger 112 and is adapted to seat upon a seat 114. A cylindrical sleeve 115 supports and guides the plunger member 112 and also guides the plunger member 116 which is pivotally secured at 117 to the operating lever L. A guiding rod 118 is preferably formed integrally with the plunger 112 and has a sliding fit in the bore 119 in the plunger. Within the sleeve 115 and between the plungers 112 and 116 is a coil spring 120. Another coil spring is disposed within the tubular member 111 and tends to normally maintain the valve 113 in unseated position. A spring 122 abuts at one end against the outer end of the portion 105 of the cylindrical member 104 and at its other end against the adjusting screw 123 which has threaded engagement with the boss 106. A lock nut 124 is preferably provided to maintain the screw 123 in the desired position and it will be seen that by adjusting the position of the screw 123 the compression of the spring 122 may be varied.

The chamber 108 is connected by a cylindrical passage 108' of larger diameter than the tubular member 121, to the chamber 125 which is connected to the atmosphere through the passage 126. A passage 127 in the bracket 100 connects the right hand side of the diaphragm chamber 101 to the chambers 28 and thus to the interior of the cylinder 11 and a vent hole 128 connects the left hand side of the diaphragm chamber 101 to the atmosphere. The spring loading unit A is substantially the same as and performs the same functions as unit A described above in connection with other forms of our invention.

The operation of the apparatus illustrated in Figure 7 is as follows:

When the parts are in the positions shown in Figure 7 the valve 26 is closed thus shutting off the connection between the source of actuating pressure and the interior of the cylinder 11. A connection between the atmosphere and the cylinder 11 is provided through the opened valve 32, and, as the valve 113 is also open, an additional connection between the interior of the cylinder 11 and the atmosphere is provided through the passage 126, the chamber 125, the passage 108', the chamber 108, the holes 109, the right hand side of the diaphragm chamber 101, the passage 127 and the chamber 28.

When the operator of the vehicle desires to apply the brakes he moves the lever L to the left. The first portion of this movement will close the valve 32 and will move the plunger 116 to the left within the sleeve 115. This movement of the plunger 116 will be transmitted through the spring 120 to the valve carrying plunger 112, moving it to the left and causing the valve 113 to be seated upon the seat 114, thus closing the auxiliary atmospheric connection to the interior of the cylinder. This closing movement of the valve plunger 112 also causes the tubular sleeve 111 to move to the left, compressing the spring 121, until the end of sleeve 111 abuts against the cylindrical member 104. The parts are preferably so proportioned that the end of the sleeve 121 will strike the member 104 before the valve 113 reaches its seat and thus the additional movement required to seat the valve 113 will also cause the diaphragm 103 to move to the left against the spring 122. Further movement of the lever L to the left will compress the spring 120 and lift the valve 26, in the manner previously described, and cause application of the vehicle brakes.

When the valve 26 is opened the pressure within the cylinder 11 is reduced and this reduction of pressure is also effected in the right hand side of the diaphragm chamber 101. However, the pressure differential between the opposite sides of diaphragm 103 is not sufficient to overcome the load imposed in the opposite direction by the spring 120 and valve 113 will remain seated. If the operator now permits the lever L to move to the right a relatively small amount the compression of the spring 120 will be relieved and the parts are so proportioned that the pressure differential acting upon the diaphragm 103, together with the force of spring 122, will now be sufficient to move the diaphragm 103 to the right. This movement will lift the valve 113 from its seat because the sleeve 111 is still in abutting relation with the member 104. When the valve 113 opens air under atmospheric pressure will enter the cylinder 11 through the passage 126, passage 108', chamber 108, holes 109, the right hand side of the diaphragm chamber 101, the passage 127 and the chamber 28, thus permitting the brakes to be released a small amount. This opening of valve 113 will also reduce the pressure differential effective upon the diaphragm 103 until the force exerted by the spring 120 is sufficient to overcome this pressure differential and the spring 122 and again close the valve 113. By adjusting the screw 123 the effect of the spring 122 may be so regulated that the desired operation will be obtained and it will be seen that with this arrangement a relatively small movement of the lever L in brake releasing relation will cause a correspondingly small change in the pressure conditions within the cylinder 11, thus releasing the brakes a proportionate amount.

If it is desired to completely release the vehicle brakes after they have been applied lever L will be permitted to return to its normal or off position and in this case the compressive force upon the spring 120 will be removed and the spring 121 will become effective to move the sleeve 111 out of engagement with the member 104 to move the valve 113 into completely open position, as shown in Figure 7.

From the above description of several embodiments of our invention it will be seen by those skilled in the art that we have provided an extremely flexible and sensitive control apparatus for fluid pressure actuated brakes whereby the operator has complete and effective control of both the application and release of the brakes.

Although we have described in considerable detail the illustrated embodiments of our invention it will be understood by those skilled in the art that modifications and variations may be made from the specific forms shown and described herein without departing from the spirit of our invention. For example, the diaphragm illustrated might be replaced by pistons operating in cylinders in well known manner and it is intended that the term "diaphragm" where used in our specification and claims, includes in its scope a piston or other equivalent mechanism. We do not, therefore, limit ourselves to the particular forms shown and described, but claim as our invention all embodiments coming within the scope of the appended claims.

We claim:

1. In a control valve mechanism for fluid pressure actuated brakes and the like, the combination of a main vacuum connection control valve, a main atmospheric connection control valve, an auxiliary atmospheric connection control valve, operating rods secured to each of said valves, a lever having pivotal connections to each of said operating rods, a diaphragm secured to the operating rod for said main vacuum control valve, a diaphragm secured to the operating rod for said auxiliary atmospheric control valve and fluid pressure conducting connections whereby the main vacuum control valve and diaphragm may be moved into closed position by atmospheric pressure, and fluid pressure conducting connections whereby the auxiliary atmospheric control valve and diaphragm may be moved into opened position by atmospheric pressure.

2. In combination in a control valve mechanism for fluid pressure actuated devices, an actuating pressure control valve, means operable by fluid pressure and adapted to move said actuating pressure valve in closing direction, an atmospheric connection control valve, means operable by fluid pressure and adapted to move said atmospheric control valve in opening direction, spring means adapted to oppose the movement of said actuating pressure valve in closing direction, independent spring means adapted to oppose the force exerted by said last named fluid pressure means to move the atmospheric control valve in opening direction, and an operating lever for said valves, said lever being adapted when moved in one direction to exert a valve opening force on said actuating pressure valve through said first named spring means and to exert a valve closing force on said atmospheric control valve through said second named spring means.

3. In combination, in apparatus of the class described, a cylinder, an actuating pressure control valve for said cylinder, an operating rod secured to said valve, a diaphragm secured to said rod, fluid passages adapted to connect one side of said diaphragm to the atmosphere and the other side of said diaphragm to said cylinder, an atmospheric connection control valve for said cylinder, an operating member secured to said atmospheric valve, a diaphragm secured to said operating member, fluid passages adapted to connect one side of said last named diaphragm to the atmosphere and the other side to said cylinder, a common operating lever for said valves, a spring interposed between said lever and said actuating pressure valve operating rod and a spring interposed between said lever and said atmospheric valve operating member whereby movement of said lever in one direction will be transmitted through said first named spring to exert an opening force on said actuating pressure valve and be transmitted through said second named spring to exert a closing force on said atmospheric valve.

4. In apparatus of the class described, a cylinder, a valve for controlling the actuating pressure connection to said cylinder, a lever adapted to operate said valve, valve mechanism for controlling a connection between said cylinder and the atmosphere, said last named valve mechanism including a housing having a diaphragm chamber therein, a diaphragm in said housing, a valve operating member secured to said diaphragm and having portions extending through the walls of said chamber on both sides of said diaphragm, a valve face on one of said portions and resilient operating connections between the other portion of said valve operating member and said lever.

5. In combination in valve mechanism of the type described, actuating pressure controlling valve means, main atmospheric pressure controlling valve means and an auxiliary atmospheric connection control valve means for the operating cylinder of a fluid pressure actuated mechanism, said auxiliary atmospheric pressure controlling means including a valve closure member adapted when in closed position to shut off an atmospheric connection to the cylinder and when in open position to complete the atmospheric connection, a diaphragm secured to said closure member and exposed on one side to atmospheric pressure and on the other side to the operating cylinder pressure whereby a reduction in cylinder pressure will tend to move said closure member in opening direction, an operating lever for said auxiliary valve and resilient connections between said diaphragm and said operating lever.

6. In apparatus of the class described, a cylinder, a valve for controlling the actuating pressure connection to said cylinder, a main atmospheric connection control valve, an auxiliary atmospheric connection control valve and an operating lever for said valves, said actuating pressure control valve and said auxiliary atmospheric connection control valve being connected to said lever at spaced points thereon and said main atmospheric connection control valve being connected to said lever between said spaced points.

7. In apparatus of the class described, a cylinder, a valve for controlling the actuating pressure connection to said cylinder, a main atmospheric connection control valve, an auxiliary atmospheric connection control valve and an operating lever for said valves, said actuating pressure control valve and said auxiliary atmospheric connection control valve being connected through resilient means to said lever at spaced points thereon and said main atmospheric connection control valve being connected to said lever between said spaced points.

8. In apparatus of the class described, a cylinder, a valve for controlling the actuating pressure connection to said cylinder, a main atmospheric connection control valve, an auxiliary atmospheric connection control valve and an operating lever for said valves, said actuating pressure control valve and said auxiliary atmospheric connection control valve being connected to said lever at spaced points thereon and said main atmospheric connection control valve being connected to said lever between said spaced points whereby said point of connection of said lever to said main atmospheric valve will form a fixed fulcrum for said lever when the main atmospheric valve is closed.

9. In apparatus of the class described, a cylinder, a valve for controlling the actuating pressure connection to said cylinder, a main atmospheric connection control valve, an auxiliary atmospheric connection control valve and an operating lever for said valves, said actuating pressure control valve and said auxiliary atmospheric connection control valve being connected through resilient means to said lever at spaced points thereon and said main atmospheric connection control valve being connected to said lever between said spaced points whereby said point of connection of said lever to said main atmospheric valve will form a fixed fulcrum for said lever when the main atmospheric valve is closed.

10. In apparatus of the class described, a cylinder, a valve for controlling the actuating pressure connection to said cylinder, a lever adapted to operate said valve, valve mechanism for controlling a connection between said cylinder and the atmosphere, said last named valve mechanism including a housing having a diaphragm chamber therein, a diaphragm in said housing, a valve operating member secured to said diaphragm and having portions extending through the walls of said chamber on both sides of said diaphragm, a valve face on one of said portions and operating connections between the other portion of said valve operating member and said lever.

11. In apparatus of the class described, a cylinder, a valve for controlling the actuating pressure connection to said cylinder, a lever adapted to operate said valve, valve mechanism for controlling a connection between said cylinder and the atmosphere, said last named valve mechanism including a housing having a diaphragm chamber therein, a diaphragm in said housing, a valve operating member secured to said diaphragm and having portions extending through the walls of said chamber on both sides of said diaphragm, a valve face on one of said portions, operating connections between the other portion of said valve operating member and said lever, and spring means adapted to oppose movement of said valve operating lever in a direction to open said actuating pressure control valve.

FREDERICK G. FOLBERTH.
WILLIAM M. FOLBERTH.